United States Patent [19]
Reninger et al.

[11] Patent Number: 5,123,519
[45] Date of Patent: Jun. 23, 1992

[54] KNUCKLED HYDRAULICALLY-ACTUATED STACKING COVEYOR

[75] Inventors: Gail F. Reninger, Erie; Brij M. Sapru, Troy; Eugene R. Rogers, Mt. Clemens, all of Mich.

[73] Assignee: Edw. C. Levy Company, Detroit, Mich.

[21] Appl. No.: 654,324

[22] Filed: Feb. 12, 1991

[51] Int. Cl.⁵ .............................................. B65G 65/00
[52] U.S. Cl. .................................. 198/508; 198/861.2
[58] Field of Search ................... 198/508, 861.2, 861.3, 198/861.6, 594, 588; 414/133

[56] References Cited
U.S. PATENT DOCUMENTS

| | | | |
|---|---|---|---|
| 3,538,996 | 11/1970 | Ledoux | 198/861.2 |
| 3,841,463 | 10/1974 | Stone et al. | 198/861.2 |
| 4,319,677 | 3/1982 | Kipper | 414/133 X |
| 4,925,010 | 5/1990 | Pallasvirta | 198/594 X |

FOREIGN PATENT DOCUMENTS 8802731  4/1981  World Int. Prop. O. ........ 198/861.3

*Primary Examiner*—Robert P. Olszewski
*Assistant Examiner*—Cheryl L. Gastineau
*Attorney, Agent, or Firm*—Harness, Dickey & Pierce

[57] ABSTRACT

An exemplary knuckled, hydraulic-actuated stacking conveyor is disclosed for conveying and stacking particle-type materials, such as aggregate, slag, sand, coal, or the like. The conveyor includes inner and outer boom sections vertically supported by an intermediate support structure that does not extend vertically above the hinged or pivotal interconnection of the boom section. A constant length link support is provided for substantially preventing sagging of the preferred two-piece, telescoping hydraulic extension member that raises and lowers the outer boom structure.

17 Claims, 5 Drawing Sheets

KNUCKLED HYDRAULICALLY-ACTUATED STACKING COVEYOR

BACKGROUND AND SUMMARY OF THE INVENTION

The present invention relates generally to conveyor apparatuses for conveying a material to a desired location and for depositing the conveyed material onto a stack or pile at such desired location. More particularly, the present invention relates to a new and improved type of such conveyors, wherein the conveyor is of a knuckled configuration, having an outer section articulated with respect to an inner section, with the articulated outer section being hydraulically actuated.

Various conveyor apparatuses have been provided in the prior art for conveying and handling material such as aggregate, slag, sand, gravel, coal, and other particle-type materials, with such apparatuses being configured to receive such material at an intake or transfer end from a truck or other transporting vehicle. The conveyor apparatus then conveys the material to a desired location, at which the material is deposited, stacked, or piled for storage.

One of the most common of such prior art conveyor apparatuses is the so-called mast-and-cable type of stacking conveyor, which includes an inner section with an outer section hingedly or pivotally attached to the inner section, and which has a very large mast or tower structure supporting the assembly at the hinged or pivotal interconnection. Such mast or tower structure is typically rather massive and extends upwardly well beyond the hinged interconnection of the inner and outer sections. Such mass and height is required for supporting cable drive mechanisms adapted for raising or lower the outer section during conveying and stacking of the material. However, it has been well known for quite some time in the industry that such mast-and-cable type stacking conveyors suffer from numerous disadvantages, including safety concerns resulting from the outer section being supported solely by block-and-tackle, cable-type mechanisms, which are well known to be highly susceptible to wear. breakage, slippage, and other undesirable hazards. In addition. such mast-and-cable conveyors are inordinately expensive to purchase and install, due to the large amount of steel and other components necessary for their manufacture, as well as being expensive to maintain and operate. Furthermore, because such mast-and-cable type stacking conveyors are very difficult to precisely control, and are frequently somewhat limited in their upward and downward range of movement, environmental concerns have become evident due to the relatively high amount of segregation of the material falling from the discharge end of the conveyor as the lighter particles of such material became separated from the main stream in high wind conditions. As a result, numerous attempts have been made to lessen these environmental hazards, including the installation of spray water devices to minimize such segregation, as well as the installation of enclosures or covers on the conveyor apparatus, the installation of downwardly-telescoping discharge chutes, and the installation of other high-cost and high-maintenance equipment. In addition to the dust or particulate environmental concerns, the aesthetic environmental impact at an installation site was undesirable due to the necessarily high visibility and high profile of such mast-and-cable type stacking conveyors, with such high profiles resulting from the great height of the mast or tower in order to facilitate the use of the cable-type apparatus for raising or lowering the outer section. A typical example of such a mast-and-cable type stacking conveyor is illustrated in the drawings in FIG. 2.

In order to address the various disadvantages and shortcomings of the prior art stacking conveyor apparatuses, including the above-mentioned mast-and-cable type stacking conveyor, the present invention seeks to provide a knuckled, hydraulically-actuated stacking conveyor that is adaptable for full automation by way of computer or other numeric control devices readily available in today's marketplace, that is capable of precise, easily controllable locating of the point of discharge of the material being conveyed, that is capable of being lowered very close to the ground, typically within six feet of grade, and that is adaptable for hydraulic operation for low maintenance and reliable operation. In addition, the present invention seeks to provide such a stacking conveyor that is substantially safer, lower in initial and operating costs, and lower in visual profile than the above-mentioned mast-and-cable type stacking conveyors. It has been found, during initial testing of stacking conveyors according to the present invention, that the various problems discussed above have been substantially eliminated, or at least substantially minimized, and that the above-mentioned environmental concerns have been significantly reduced or virtually eliminated.

According to the present invention, a stacking conveyor apparatus for conveying material to a desired location and for depositing the conveyed material into a carefully controlled stack or pile at such desired location includes a first elongated boom section having an intake end for receiving the material to be conveyed, with said first boom section sloping upwardly and outwardly away from the intake end. A second elongated boom section is hingedly interconnected at one end with the first boom section in a generally longitudinally end-to-end relationship therewith, and extends outwardly away from the hinged interconnection to an opposite discharge end. The second boom section is selectively and pivotally movable upwardly and downwardly relative to the first boom section, about the hinged interconnection. An intermediate vertical support structure vertically supports the hingedly interconnected ends of the first and second boom sections, with the intermediate support structure being selectively movable laterally in order to pivot the stacking conveyor apparatus laterally, generally in an arc about the intake end of the first boom section. In addition, the vertical support structure preferably does not extend vertically above the hinged interconnection of the generally adjacent ends of the first and second boom sections.

The conveyor apparatus also includes a conveyor belt, track, or other such conveyor means for moving the material from the intake end of the first boom section to the discharge end of the second boom section, as well as an extension member extending between the vertical support structure and the upwardly and downwardly pivotal second boom section. The extension member, which is preferably a two-piece telescopic configuration, is selectively extendible and retractable, preferably by way of hydraulic-actuated drive means, in order to selectively pivot the second boom section between raised and lowered positions. In order to facilitate the proper alignment and ease of operation of the extension member, a support link member pivotally extends between the vertical support structure and the extension member in order to substantially minimize or prevent sagging of the extension member during raising and lowering of the second boom section. Preferably, the support link consists of a cable interconnecting the vertical support structure and the extension member, but a relatively rigid link can also ultimately be used in appropriate applications. Such support link is preferably of a constant length regardless of the raised or lowered position of the second or outer boom section.

Additional objects, advantages, and innovative features of the present invention will become apparent from the following description and the appended claims, taken in conjunction with the accompanying drawings.

DETAILED DESCRIPTION OF THE PREFERRED EMBODIMENTS

Figure 1:
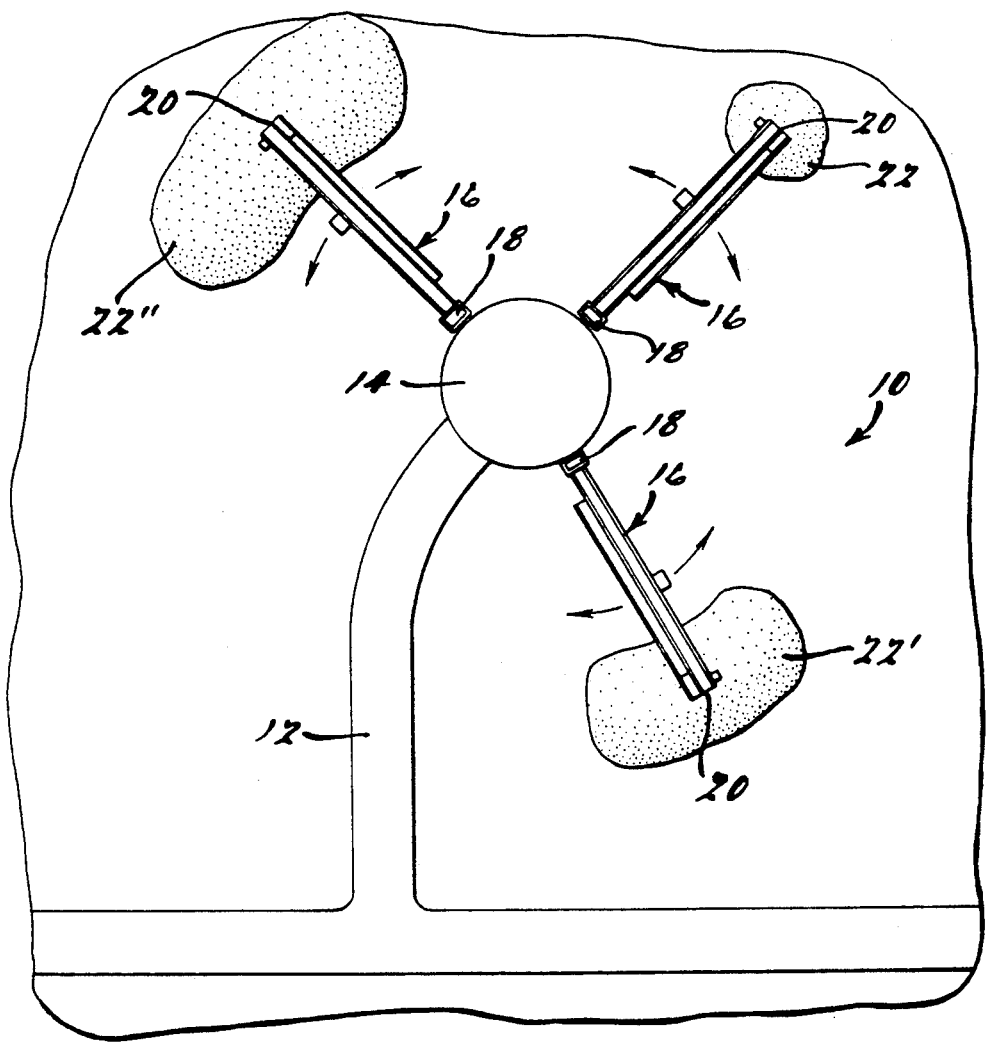
FIG. 1 is a diagrammatic yard plan view of an installation adapted for storing and sorting materials, such as aggregate, slag, sand, coal, or other such materials.
Figure 2:
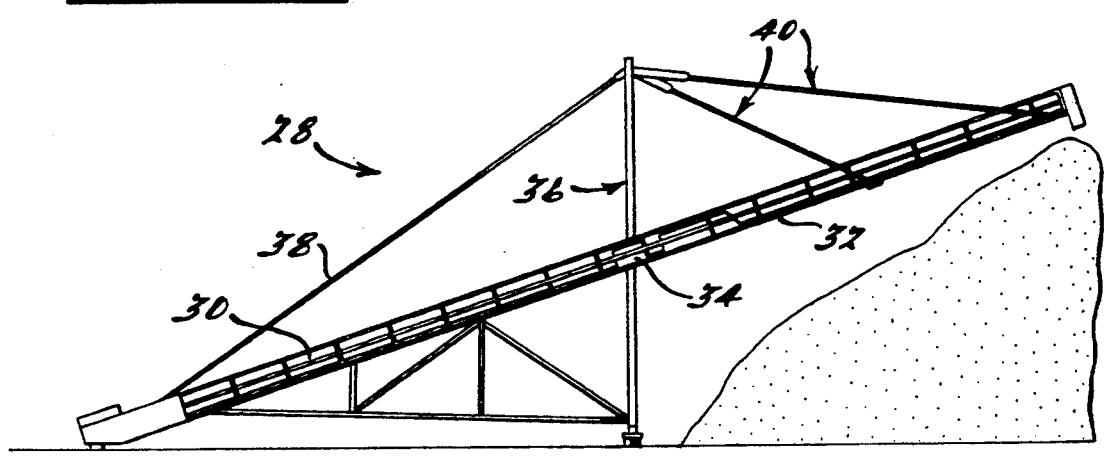
FIG. 2 is an elevational view of a typical prior art mast-and-cable stacking conveyor.

FIGS. 1 through 6 depict exemplary embodiments of a knuckled, preferably hydraulically-actuated stacking conveyor, according to the present invention, for purposes of illustration only. One skilled in the art will readily recognize from the accompanying drawings and from the discussion below that the principles of the present invention are equally applicable to other conveyor-type apparatuses other than those shown for purposes of illustration in the drawings.

FIG. 1 illustrates a typical, representative diagrammatic yard plan view of a material handling yard 10, having an access roadway 12 leading to a transfer area 14, at which material can be transferred between transport vehicles and stacking conveyors 16 according to the present invention. Such stacking conveyors 16 generally include an intake end 18 for receiving the material to be conveyed and stacked or stored, as well as a discharge end 20 for discharging or depositing the material into stacks or piles 22. As mentioned above, it is highly desirable that the depositing and stacking of the material be accurately controllable for purposes of efficient yard area usage, as well as for minimizing environmental impact.

In the past, such environmental concerns have become significant as the public's demand for environmentally responsible installations has increased. Many of the undesirable effects leading to such environmental concerns have been caused, or have resulted from, the use of prior art mast-and-cable type stacking conveyors, such as the stacking conveyor 28 illustrated in FIG. 2. Such prior art stacking conveyors included an inner section 30 to which an outer section 32 was hingedly interconnected, such as is indicated at reference numeral 34. A very large, tall mast or tower structure 36 was necessary for supporting the inner and outer sections 30 and 32, as well as for supporting a cable drive mechanism, illustrated generally at reference numeral 40, for raising and lowering the outer section 32. Because of the relative instability of such massive mast or tower structures 36, and because of the forces imparted to such structures by the cable driven apparatus 40, various supporting lines or cables, such as those illustrated generally at reference numeral 38 were required. As mentioned above, stacking conveyors such as the mast-and-cable type stacking conveyor 28 illustrated in FIG. 2 were susceptible to safety and maintenance problems resulting from the inherent wear, slippage, or breakage tendencies of the cable driven apparatus 40, as well as being costly to install, maintain, and operate, due in part to the high power requirements necessitated by the cable driven apparatus 40. In addition, such stacking conveyors of the mast-and-cable type illustrated in FIG. 2 were difficult to precisely control during operation, thus resulting in the environmental concerns and hazards discussed above.

Figure 3:
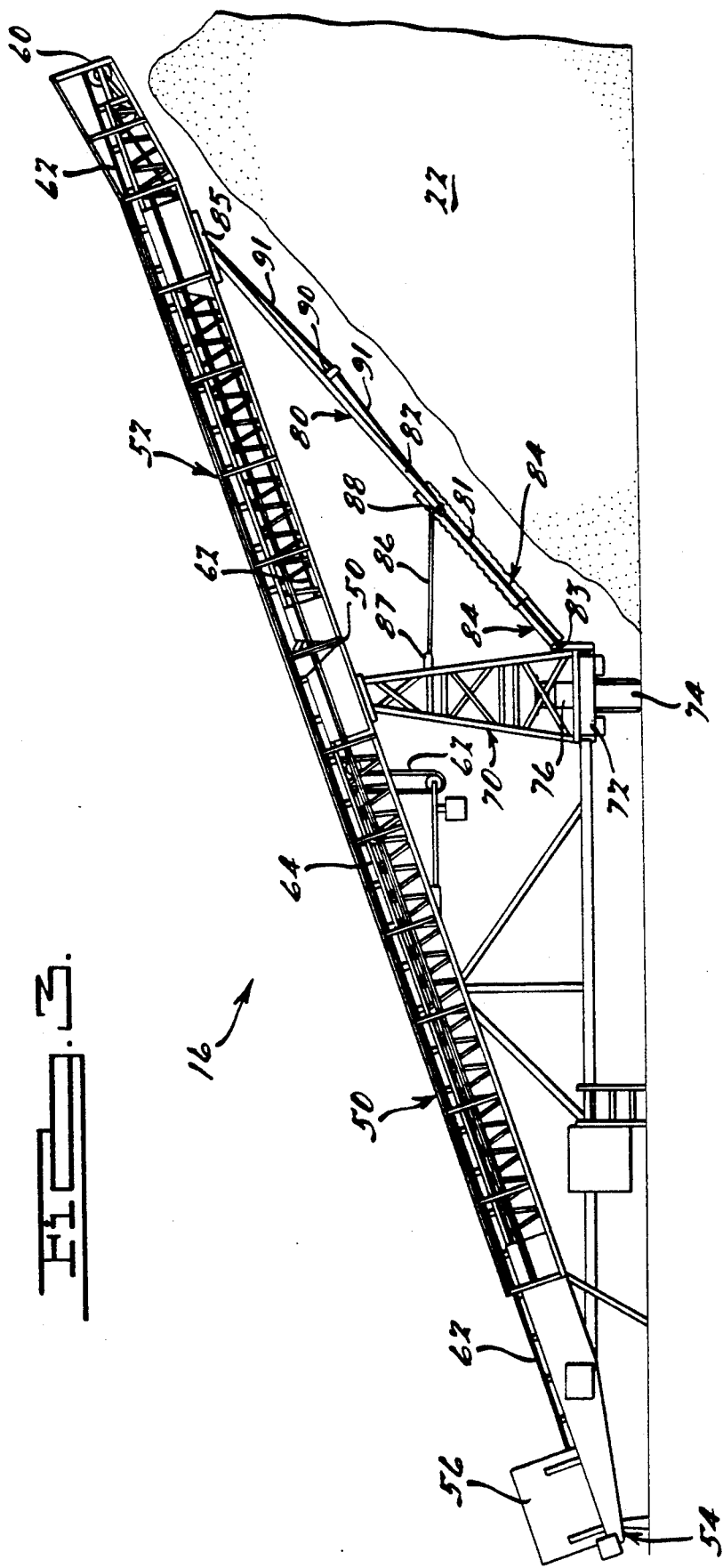
FIG. 3 is an elevational view similar to that of FIG. 2, but illustrating an exemplary knuckled, hydraulically-actuated stacking conveyor according to the present invention.
Figure 4:
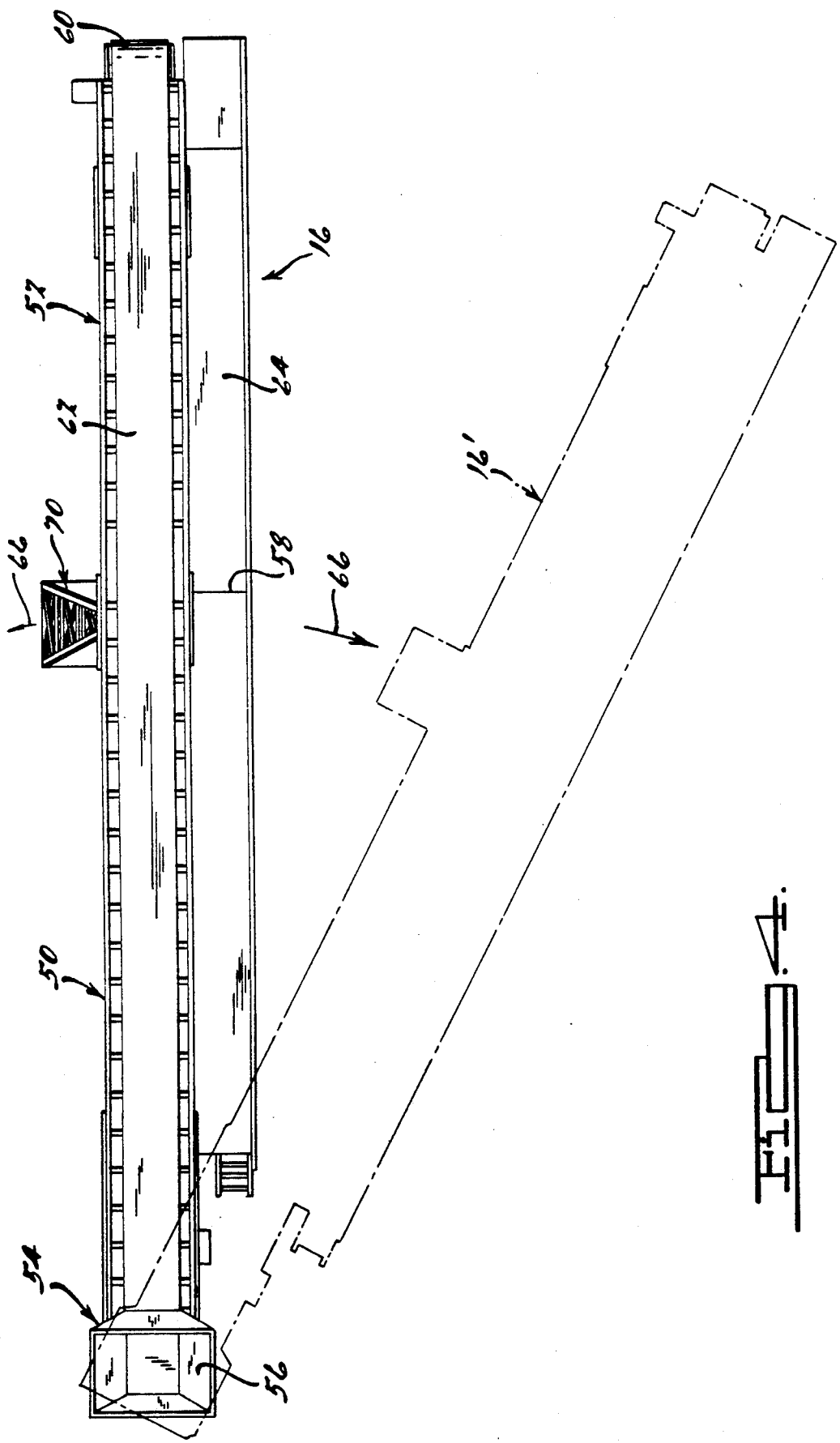
FIG. 4 is a top view of the stacking conveyor of FIG. 3.
Figure 5:
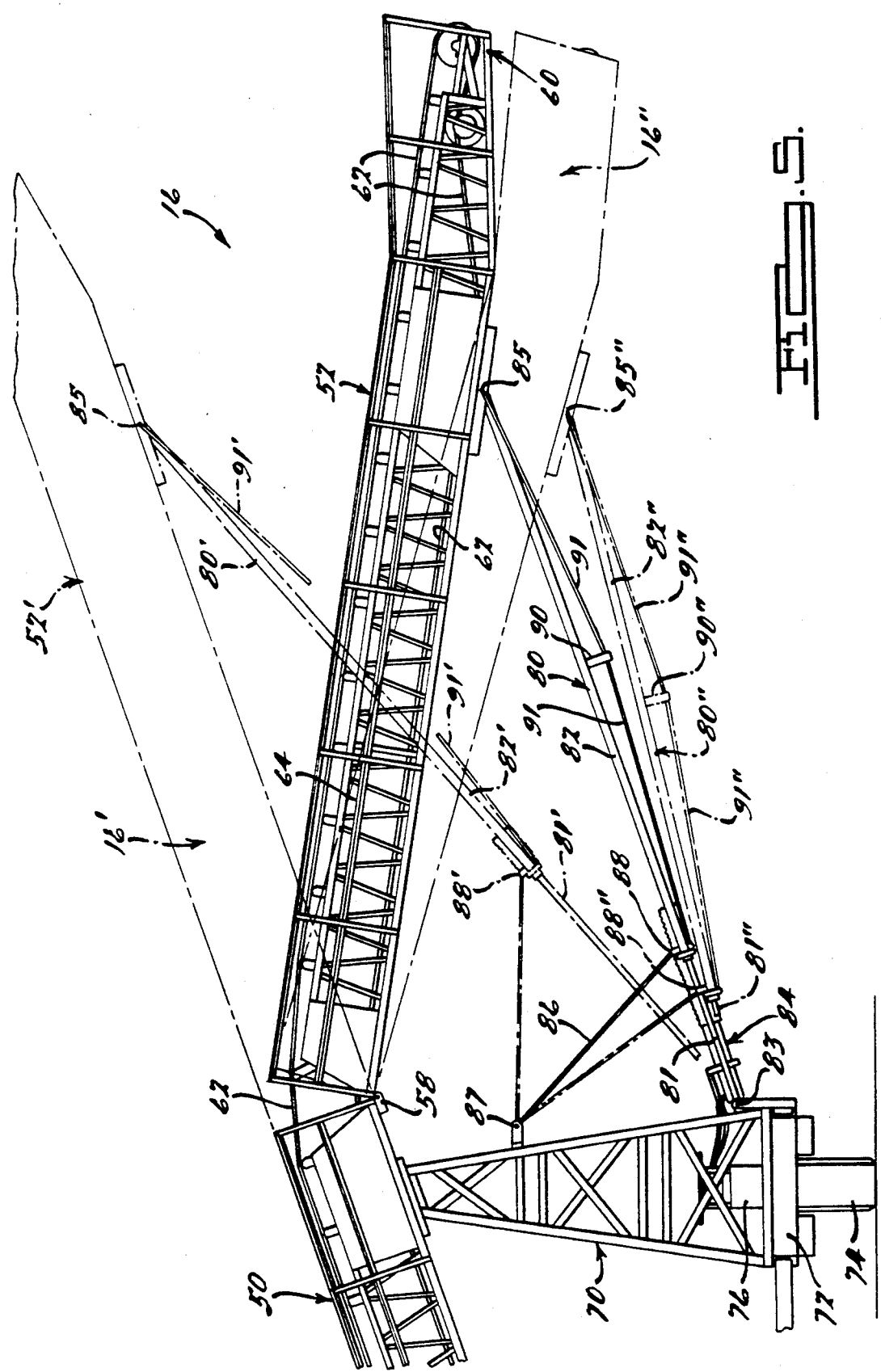
FIG. 5 is an enlarged partial elevational view of the stacking conveyor of FIGS. 3 and 4, illustrating the apparatus for raising and lowering the outer boom section in more detail.

In order to overcome such disadvantages and shortcomings, the present invention seeks to provide an improved stacking conveyor apparatus, with an exemplary stacking conveyor apparatus 16, according to the present invention, being illustrated in FIGS. 3 through 5. A preferred stacking conveyor apparatus 16 includes a first or inner boom section 50, a second or outer boom section 52, hingedly or pivotally interconnected with one another in a longitudinally end-to-end relationship at the hinged interconnection 58. The first boom section 50 has an intake end 54, which can include a hopper 56, or other well-known components adapted for transferring the material to be conveyed from transport vehicles or other apparatuses to the stacking conveyor 16.

The second boom section 52 includes a free, discharge end 60, with a continuous conveyor belt 62 disposed for continuous movement from the intake end 54, through the hinged interconnection area 58, to the discharge end 60. A walkway 64 is preferably provided for purposes of allowing access to the various parts of the structure in order to perform inspection, maintenance or repair activities.

The first and second boom sections 50 and 52, respectively, are vertically supported by an intermediate support structure 70, which because of the innovative nature of the stacking conveyor 16 does not extend vertically above the hinged interconnection area 58. The intermediate support structure 70 vertically supports the adjacent ends of the first and second boom sections 50 and 52, respectively, and preferably includes a platform-type structure 72 for supporting or housing various control or drive components discussed below. The platform 72 of the intermediate support structure 70 also includes selectively drivable wheels 74 that allow for selective pivotal, lateral movement of the entire conveyor apparatus 16 in both pivotal lateral directions, as is diagrammatically illustrated by pivotal direction arrows 66 in FIG. 4. Such lateral pivotal movement allows the stacking conveyor apparatus 16 to be laterally swung, generally about the intake end 54, thus facilitating the depositing, stacking, and storing of the conveyed material in a generally arc-like configuration, such as that shown diagrammatically in FIG. 1. Such lateral swinging movement is accomplished by well-known drive components, such as an electric motor, an internal combustion engine, or the like, in order to drive the wheels 74 and laterally swing the conveyor apparatus 16.

Referring primarily to FIGS. 3 and 5, the outer or second boom section 52 is hingedly interconnected at reference numeral 58 with the first or inner boom section 50, thus allowing the outer boom section 52 to be raised or lowered in order to maintain the discharge end 60 in close proximity of the pile or stack 22 during the conveying and depositing operations. Such selective raising and lowering of the outer boom section 52 is accomplished according to the present invention by way of a selectively extendible and retractable extension member 80, which is preferably a two-piece telescopic configuration, having an inner extension piece 81 slidably and telescopically received within an outer extension piece 82. The extension member or assembly 80 pivotally interconnects the intermediate vertical support structure 70 and the outer boom section 52 by way of an inner pivot interconnection 83 and an outer pivot interconnection 85 at its opposite ends. Preferably, a pair of extension members or assemblies 80, each being of such two-piece configuration, are used to raise and lower the outer boom 52. If needed in a given application, each outer extension piece 82 can be stiffened by a stiffening strut 90 with stiffening cables 91 extending to each end of the outer extension piece 82.

Preferably, according to the present invention, the extension member or assembly 80 is selectively extended and retracted in order to respectively raise or lower the outer boom section 52 by way of a hydraulic actuator apparatus shown diagrammatically in FIGS. 3 and 5 and indicated by reference numeral 84, which is powered by a hydraulic fluid supply system 76, for example. The hydraulic actuator apparatus 80 can include a hydraulic cylinder and dirt boot arrangement and can be attached to a common bar member (not shown) that is attached to both outer extension pieces 82, if two extension members 80 (or more) are used. The hydraulic actuator apparatus can also alternately consist of other hydraulic lifting, pushing, or pulling devices well-known to those skilled in the art. Such well-known hydraulic actuator apparatuses are highly advantageous due to their relatively lower power requirements, their lower maintenance requirements, and their ability to be more precisely positioned and controlled, at least when compared with the mast-and-cable type conveyors discussed above.

During initial testing of an initial prototype of the present invention, it was found that the hydraulic actuator apparatus 84 and the preferred two-piece extension member assembly 80 performed relatively well over much of the operating range in raising or lowering the outer boom section 52. However, because typical applications of a stacking conveyor according to the present invention require the stacking conveyor 16 to be rather large, frequently having an overall length of approximately 150 feet, it was discovered that the extension member assembly had a tendency to bind due to sagging when extended to the outer ranges of its extension. This presented a rather formidable problem due to the fact that during raising and lowering of the outer boom section 52, the outer boom section 52 moves pivotally about the hinged interconnection 58, and due to the fact that the extension member must extend or retract while simultaneously pivoting about the inner pivot interconnection 83 with the vertical support structure 70 and about the outer pivot interconnection 85 with the outer boom section 52.

After extensive investigation and research, however, it was discovered that a link support member 86 could be carefully sized and located for pivotal interconnection at the upper pivot connection 87 with the intermediate support structure 70, and at the lower pivot connection 88 with the extension member 80, in order to provide vertical support that substantially eliminated the above-discussed sagging problem, thus facilitating the proper "colinear" alignment and ease of slidable movement of the inner extension piece 81 within the outer extension piece 82. By such careful sizing and positioning of the link support member 86 and its pivotal interconnections with the other components, it was discovered that the link support member 86 could be of a substantially constant length, thus greatly simplifying its construction, cost, reliability, and safety, when compared with a support member that would have to change in length at various raising or lowering positions of the outer boom section 52. Thus, the link support member 86 was found to be critical to both the proper and successful functioning of the present invention and the use of the preferred hydraulically-actuated extension member 80, thus also resulting in an intermediate vertical support structure 70 that does not extend vertically above the hinged interconnection area 58. In addition, the interrelationship and operative cooperation of these components was found to result in a significant increase in the precision controllability of the movement of the components of the stacking conveyor 16, and thus the precision stacking and depositing of the material in a carefully-controlled pile 22, as well as facilitating the precise locating of the discharge end 60 at all times during operation of the stacking conveyor 16. This precise control, as well as the lower maintenance and operating costs resulting from the present invention, were found to provide highly advantageous effects in terms of environmental impact, safety, and economy.

Figure 6:
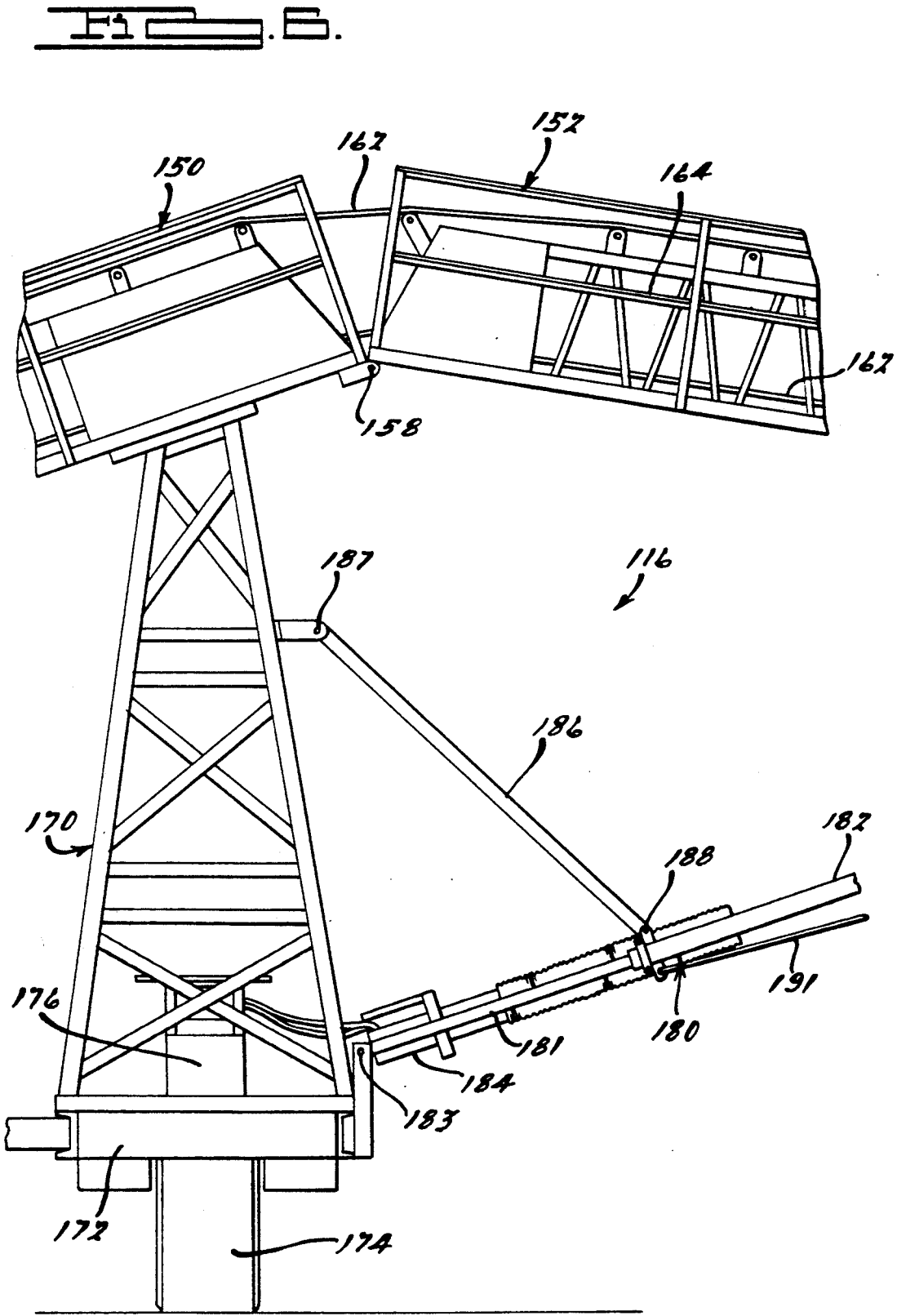
FIG. 6 is a view similar to that of FIG. 5, but illustrating an exemplary alternate construction of a stacking conveyor according to the present invention.

FIG. 6 illustrates an optional, alternate embodiment of the present invention, which is generally similar to that depicted in FIGS. 3 through 5, with certain exceptions noted below. Because of such similarities, both in terms of construction and function, similar reference numerals are used to indicate the various components in FIG. 6 that correspond to the various components depicted in FIGS. 3 through 5, but with the corresponding components of FIG. 6 being indicated by reference numerals having one-hundred prefixes added to the corresponding reference numerals of FIGS. 3 through 5.

As mentioned above, the stacking conveyor 116 in FIG. 6 is substantially identical in construction and function to the stacking conveyor 16 illustrated in FIGS. 3 through 5, with the exception that the cable link support member 86 is replaced by a relatively rigid bar-type link support member 186 in FIG. 6. As with the cable-type link support member 86, the bar-type link support member 186 is of a substantially constant length at all times during the operation of the stacking conveyor 116, regardless of the raised or lowered position of the outer boom section 152. As mentioned above in connection with the stacking conveyor 16 depicted in FIGS. 3 through 5, the bar-type link support member 186 of the stacking conveyor 116 of FIG. 6 is critical to the proper and successful operation and function of the stacking conveyor according to the present invention.

The foregoing discussion discloses and describes merely exemplary embodiments of the present invention for purposes of illustration only. One skilled in the art will readily recognize from such discussion and from the accompanying drawings and claims, that various changes, modifications, and variations can be made therein without departing from the spirit and scope of the invention as defined in the following claims.

What is claimed is:

1. A stacking conveyor apparatus for conveying material to a desired location and for depositing the conveyed material onto a stack or pile at the desired location, said conveyor apparatus comprising: a first elongated boom section having an intake end for receiving the material to be conveyed, said first boom section sloping upwardly and outwardly away from said intake end; a second elongated boom section hingedly interconnected at one end with said first boom section in a generally longitudinally end-to-end relationship therewith and extending outwardly away from said hinged interconnection to an opposite discharge end, said second boom section being selectively pivotally movable upwardly and downwardly relative to said first boom section about said hinged interconnection; an intermediate vertical support structure interconnected with the hingedly interconnected ends of said first and second boom sections, said intermediate support structure vertically supporting the hingedly interconnected ends and being selectively movable laterally in order to selectively pivot said first and second boom sections laterally generally about said intake end of said first boom section; and conveyor means for moving the material to be conveyed from said intake end of said first boom section to said discharge end of said second boom section; said conveyor apparatus further including an extension member interconnecting said vertical support structure and said second boom section; extension drive means for selectively extending and retracting said extension member in order to selectively pivotally raise and lower said second boom section relative to said first boom section; and support link means interconnecting said vertical support structure and said extension member in order to vertically support said extension member during said selective raising and lowering of said second boom section, said support link means being of a substantially constant length regardless of the raised or lowered position of said second boom section relative to said first boom section.

2. A conveyor according to claim 1, wherein said vertical support structure does not extend vertically above said hinged interconnection of said first and second boom sections.

3. A conveyor according to claim 1, wherein said support link means includes a cable interconnecting said vertical support structure and said extension member.

4. A conveyor according to claim 1, wherein said support link means includes a relatively rigid link interconnecting said vertical support structure and said extension member.

5. A conveyor according to claim 1, wherein said support link means is pivotally interconnected at one end with said extension member and is pivotally interconnected at the opposite end with said vertical support structure at a first vertical location thereon, said first vertical location being above a second vertical location at which said extension member is interconnected with said vertical support structure, the distance between said first vertical location and the location at which said opposite end of said support link means is interconnected with said extension member remaining substantially constant regardless of the raised or lowered position of said second boom section relative to said first boom section.

6. A conveyor according to claim 1, wherein said extension drive means includes a hydraulic actuator.

7. A conveyor according to claim 1, further including lateral pivot drive means selectively actuable for drivingly moving said vertical support structure laterally in order to selectively pivot said first and second boom sections laterally generally about said intake end of said first boom section.

8. A conveyor according to claim 1, wherein said second boom section is pivotally movable relative to said first boom section between a fully raised position wherein said first and second boom sections are aligned in a substantially longitudinally colinear relationship and a fully lowered position wherein said free opposite end of said second boom, section is approximately six feet above the ground.

9. A conveyor according to claim 1, wherein said extension member is of a two-piece telescopic construction, wherein one extension member piece is telescopically and slidably received for movement within another extension member piece.

10. A conveyor according to claim 9, wherein said support link means vertically supports said two-piece telescopic extension member to substantially minimize sagging of said extension member in order to maintain said extension member pieces in a substantially aligned colinear relationship regardless of the raised or lowered position of said second boom section relative to said first boom section, thereby facilitating said slidable movement of said one extension member piece within said other extension member piece.

11. A conveyor according to claim 10, wherein said support link means is of a substantially constant length regardless of said raised or lowered position of said second boom section relative to said first boom section.

12. A conveyor according to claim 11, wherein said vertical support structure does not extend vertically above said hinged interconnection of said first and second boom sections.

13. A stacking conveyor apparatus for conveying material to a desired location and for depositing the conveyed material onto a stack or pile at the desired location, said conveyor apparatus comprising: a first inner elongated boom section having an intake end for receiving the material to be conveyed, said first boom section sloping upwardly and outwardly away from said intake end; a second outer elongated boom section hingedly interconnected at one end with said first boom section in a generally longitudinally end-to-end relationship therewith and extending outwardly away from said hinged interconnection to an opposite discharge end, said second boom section being selectively pivotally movable upwardly and downwardly relative to said first boom section about said hinged interconnection; an intermediate vertical support structure interconnected with the hingedly interconnected ends of said first and second boom sections, said intermediate support structure vertically supporting the hingedly interconnected ends and being selectively movable laterally in order to selectively pivot said first and second boom sections laterally generally about said intake end of said first boom section; and conveyor means for moving the material to be conveyed from said intake end of said first boom section to said discharge end of said second boom section; said conveyor apparatus further including a two-piece telescopic extension member pivotally interconnecting said vertical support structure and said second boom section; hydraulically-actuated extension drive means for selectively extending and retracting said extension member in order to selectively pivotally raise and lower said second boom section relative to said first boom section; and support link means pivotally interconnecting said vertical support structure and said extension member in order to vertically support said extension member during said selective raising and lowering of said second boom section, said support link means being of a substantially constant length regardless of the raised or lowered position of said second boom section relative to said first boom section.

14. A conveyor according to claim 13, wherein said support link means includes a cable interconnecting said vertical support structure and said extension member.

15. A conveyor according to claim 13, wherein said support link means includes a relatively rigid link interconnecting said vertical support structure and said extension member.

16. A conveyor according to claim 13, wherein said second boom section is pivotally movable relative to said first boom section between a fully raised position wherein said first and second boom sections are aligned in a substantially longitudinally colinear relationship and a fully lowered position wherein said free opposite end of said second boom section is approximately six feet above the ground.

17. A conveyor according to claim 16, wherein said support link means vertically supports said two-piece telescopic extension member to substantially minimize sagging of said extension member in order to maintain said extension member pieces in a substantially aligned colinear relationship regardless of the raised or lowered position of said second boom section relative to said first boom section, thereby facilitating said slidable movement of said one extension member piece within said other extension member piece.

* * * * *

UNITED STATES PATENT AND TRADEMARK OFFICE
CERTIFICATE OF CORRECTION

PATENT NO. : 5,123,519
DATED : June 23, 1992
INVENTOR(S) : Reninger, et al

It is certified that error appears in the above-identified patent and that said Letters Patent is hereby corrected as shown below:

On the Title Page, in the Title, "COVEYOR" should be --CONVEYOR--.

Column 1, in the Title, "COVEYOR" should be --CONVEYOR--.

Column 1, line 43, "." should be --,--.

Column 1, line 44, "." (second occurrence) should be --,--.

Signed and Sealed this

Third Day of August, 1993

Attest:

MICHAEL K. KIRK

*Attesting Officer*  *Acting Commissioner of Patents and Trademarks*